(12) United States Patent
Gopalan et al.

(10) Patent No.: US 7,797,326 B2
(45) Date of Patent: Sep. 14, 2010

(54) METHOD OF OBTAINING DATA SAMPLES FROM A DATA STREAM AND OF ESTIMATING THE SORTEDNESS OF THE DATA STREAM BASED ON THE SAMPLES

(75) Inventors: Parikshit Gopalan, Atlanta, GA (US); Robert Krauthgamer, Albany, CA (US); Jayram S. Thathachar, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 11/405,994

(22) Filed: Apr. 18, 2006

(65) Prior Publication Data

US 2007/0244891 A1    Oct. 18, 2007

(51) Int. Cl.
  G06F 7/00    (2006.01)
  G06F 17/30   (2006.01)
(52) U.S. Cl. .................. 707/752; 707/722; 707/736; 707/758; 707/781; 709/238
(58) Field of Classification Search .................. None
  See application file for complete search history.

(56) References Cited

U.S. PATENT DOCUMENTS

| | | | |
|---|---|---|---|
| 5,519,698 A * | 5/1996 | Lyles et al. ............... | 370/411 |
| 5,535,384 A * | 7/1996 | Kasahara .................. | 1/1 |
| 5,694,125 A * | 12/1997 | Owsley et al. ............. | 341/50 |
| 5,761,538 A | 6/1998 | Hull | |
| 5,813,004 A * | 9/1998 | Meck et al. ............... | 707/7 |
| 5,870,752 A * | 2/1999 | Gibbons et al. ........... | 707/102 |
| 6,708,174 B1 | 3/2004 | Tenorio | |
| 6,744,388 B1 | 6/2004 | Khu | |
| 6,757,284 B1 | 6/2004 | Galles | |
| 7,016,904 B1 * | 3/2006 | Grove et al. ............... | 707/100 |
| 7,519,613 B2 * | 4/2009 | Guha et al. ................ | 707/102 |
| 7,633,638 B2 * | 12/2009 | Ducato ...................... | 358/1.15 |

(Continued)

OTHER PUBLICATIONS

Manku et al. "Approximate Frequency Counts over Data Streams" Proceedings of the 28th VLDB Confeerence, Hong Kong China, 2002. pp. 1-12.*

(Continued)

*Primary Examiner*—Khanh B Pham
*Assistant Examiner*—Usmaan Saeed
(74) *Attorney, Agent, or Firm*—Gibb I.P. Law Firm, LLC

(57) ABSTRACT

Disclosed is a method of scanning a data stream in a single pass to obtain uniform data samples from selected intervals. The method comprises randomly selecting elements from the stream for storage in one or more data buckets and, then, randomly selecting multiple samples from the bucket(s). Each sample is associated with a specified interval immediately prior to a selected point in time. There is a balance of probabilities between the selection of elements stored in the bucket and the selection of elements included in the samples so that elements scanned during the specified interval are included in the sample with equal probability. Samples can then be used to estimate the degree of sortedness of the stream, based on counting how many elements in the sequence are the rightmost point of an interval such that majority of the interval's elements are inverted with respect to the interval's rightmost element.

12 Claims, 4 Drawing Sheets

U.S. PATENT DOCUMENTS

| | | | |
|---|---|---|---|
| 2003/0068097 A1* | 4/2003 | Wilson et al. | 382/276 |
| 2004/0049596 A1* | 3/2004 | Schuehler et al. | 709/238 |
| 2004/0213291 A1* | 10/2004 | Beshai et al. | 370/473 |

OTHER PUBLICATIONS

Nie et al. "Approximate Frequency Counts In Sliding Window Over Data Stream" May 2005, IEEE, pp. 2232-2236.*

Babcock et al. "Models and Issues in Data Stream Systems" ACM PODS 2002 Jun. 3-6, pp. 1-16.*

Johnson et al. "Sampling Algorithms in a Stream Operator" ACM SIGMOD 2005, Jun. 14-16, pp. 1-12.*

Cormode et al. "Summarizing and Mining Inverse Distributions on Data Streams via Dynamic INverse Sampling" Proceedings of the 31st VLDB Conference. 2005, pp. 25-36.*

Jeffrey Scott Vitter. "Randon Sampling With a Reservoir" ACM Transactions on Mathematical Software, vol. 11, Mar. 1985, pp. 37-57.*

Kumar et al. "Data Streaming Algorithms for Efficient and Accurate Estimation of Flow Size Distribution" ACM Jun. 12-16, 2004, pp. 177-188.*

Jermaine et al. "Maintenance of Very Large Random Samples" SIGMOD 2004, Jun. 13-18, pp. 299-310(1-12).*

Babcock et al. "Sampling from a Moving Window Over Streaming Data" Proceedings of the thirteenth annual ACM-SIAM symposium on Discrete algorithms, 2002, pp. 633-634.*

Ailon et al. "Estimating the distance to a Monotone Function" Princeton University, Oct. 3, 2005, pp. 1-18.*

Babcock et al. "Models and Issues in Data Stream Systems" ACM 2002, pp. 1-29.*

Castro et al. "Sorting, Measures of disorder, and Worst-case performance" 1991, lecture notes on Computer Science, vol. 555, pp. 124-133.*

Liben-Nowell, et al., "Finding Longest Increasing and Common Subsequences in Streaming Data," In Computing and Combinatorics, $11^{th}$ Annual International Conference, (COCOON'05), pp. 263-5272, 2005.

Ajtai, et al., "Approximate Counting of Inversions in a Data Stream," In Proceedings of the $34^{th}$ Annual ACM Symposium on Theory of Computing (STOC'02), pp. 370-379, 2002.

Cormode, et al., "Permutation Editing and Matching via Embeddings," In Proceedings of $28^{th}$ International Colloquium on Automata, Languages and Programming (ICAPLP'01), pp. 481-492, 2001.

Ergün, et al., "Spot-Checkers," Journal of Computing and System Sciences, 60(3) pp. 717-751, 2000.

Gupta, et al., "Counting Inversions in Lists," In Proceedings of the $14^{th}$ ACM-SIAM Symposium on Discrete Algorithms (SODA'03), pp. 253-254, 2003.

Goldreich, et al, "Testing Monotonicity," Combinatorica, 20(3), pp. 301-337, 2000.

Ailon, et al., "Estimating the Distance to a Monotone Function," In $8^{th}$ International Workshop on Randomization and Computation, (RANDOM'04), pp. 229-236, 2004.

Fischer, et al., "Monotonicity Testing Over General Poset Domains," In Proceedings of the $34^{th}$ Annual ACM Symposium on Theory of Computing (STOC'02), pp. 474-483, 2002.

J.S. Vitter, "Random Sampling with a Reservoir," ACM Transactions on Mathematical Software, 11(1), pp. 37-57, 1985.

Babcock; Models and issues in data stream systems; ACM; 2002.

* cited by examiner

METHOD OF OBTAINING DATA SAMPLES FROM A DATA STREAM AND OF ESTIMATING THE SORTEDNESS OF THE DATA STREAM BASED ON THE SAMPLES

BACKGROUND

1. Field of the Invention

The embodiments of the invention generally relate to sorting data streams and, more particularly, to a method of obtaining uniform data samples from selected intervals in a data stream and of estimating the distance from monotonicity (i.e., sortedness) of the data stream based on the samples.

2. Description of the Related Art

In applications that access data in a streaming fashion (e.g. large data sets and internet packet routing), it is often desirable to estimate the sortedness of the data stream; however, is difficult to estimate sortedness without actually sorting the data stream.

More particularly, a sequence a of length n over an alphabet $\Sigma=\{1, \ldots, m\}$, is said to be montone (or in increasing sorted order) if:

$$\sigma(1) \leq \sigma(2) \ldots \leq \sigma(n)$$

The distance from monotonicity of a sequence σ denoted by Ed(σ) is the minimum number of edit operations needed to make it monotone. A single edit operation consists of deleting a character and inserting it in a new position. If m=n and σ consists of n distinct characters, then Ed(σ) corresponds to the so-called Ulam distance between σ and the identity permutation. If we think of σ as a deck of cards, then this is the minimum number of moves needed to sort the deck. Thus, it is a natural measure of the degree of sortedness of a sequence.

An estimation of sortedness may be useful in data streams corresponding to network routing. For example, a router is a computer networking device that forwards data packets across a network toward their destinations. In several protocols, including, internet protocols (IP), a packet flow (i.e., a sequence of packets that is sent from a single source to a single destination) is not guaranteed to maintain its order. That is, the packets are not guaranteed to arrive in the order in which they were sent. Typically, packets that arrive out of order indicate that the path used to route the flow is suboptimal. For example, the flow may be routed using multiple paths in the network, and if one of these paths is significantly more congested than the others, packets using this path will be routed much slower than the other packets. Typically, the sender annotates the packets in a flow with increasing numeric identifiers and, therefore, the destination node (and also routers along the way) can estimate the quality of the current routing policy by measuring the sortedness of the received packets.

An estimation of sortedness may also be useful when comparing very long rankings (i.e., ordered lists of distinct items). For example, a ranking may describe all the pages on the web ordered by some score function and there may be a need to compare today's ranking with that of yesterday. In this case, one of the rankings will play the role of the increasing sequence and the crucial issue is to be able to determine the order of two items (according to the first ranking). Clearly, if the first ranking is assumed to be increasing, then an estimation of sortedness can be used immediately to compare the second ranking with the first ranking. Otherwise, this first ranking requires some computation which may be provided by a suitable service (or a server). Even though the ranking is very large, accessing this service may be very fast if it is actually implemented using a large-scale distributed system with many servers (which is a common infrastructure for web search engines).

However, as mentioned above, estimating sortedness in a feasible manner (i.e., without having to scan the data stream more than once and/or without having to actually sort the entire sequence) is difficult. Therefore, there is a need in the art for a method that requires only one pass over a sequence of data elements, adequately samples data elements from the sequence during that one pass and estimates how close the sequence is to being sorted based on the samples.

SUMMARY

In view of the foregoing, disclosed herein is a method of scanning a data stream one time in order to obtain uniform data samples from selected intervals in that data stream as well as a method of using the obtained data samples to estimate the degree of sortedness of that data stream. The degree of sortedness is also referred to as the distance from monotonicity or the number of elements that must be deleted from the data stream in order to place the elements in the data stream in a sorted order (e.g., an increasing value order). More particularly, disclosed herein are two embodiments of a method of sampling elements from a data stream. In each of these embodiments multiple samples are obtained (either all from a single data bucket or each from a corresponding smaller data bucket) and each of the samples obtained comprises a uniform sample from a specified interval immediately prior to a selected point in time. These multiple data samples are then used to estimate the degree of sortedness of the data stream. Also, disclosed are exemplary algorithms that may be used to implement the various embodiments of the invention.

In one embodiment of the sampling method of the invention, the elements of the data stream are scanned in one pass. As the elements are scanned, a predetermined number of the scanned elements are randomly selected for storage in a single data bucket. The single data bucket can be a single storage area within memory, where a collection of the scanned elements, including their attributes (e.g., time scanned), are recorded, stored and maintained. This selection process is random; however, later scanned elements are selected for storage in the data bucket with a greater probability than earlier scanned elements. Once an element is selected, it is stored in the data bucket and the order in which it was scanned-in is recorded. Furthermore, as the scanning process progresses and the data bucket is filled, the elements in the data bucket are periodically modified (i.e., some elements are deleted from the data bucket and others are added). Again this modification process is random; however, earlier scanned elements are selected for removal from storage with a smaller probability than later scanned elements. As the modification process proceeds, the predetermined number of scanned elements in the bucket is maintained.

In addition to storing scanned elements in the single data bucket, at multiple selected times during the scanning process, a sample of the scanned elements from the data bucket is obtained. That is, for each sample associated with a selected time, some of the scanned elements from the data bucket are randomly selected for inclusion in a sample. Thus, multiple samples (i.e., a different sample associated with each of the selected times) are obtained. While the selection of the scanned elements is random, the process is such that each of the samples comprises a uniform sample from a specified interval immediately prior to its associated selected time. More particularly, each of the samples are obtained by selecting a point in time during the scanning process, identifying a specified interval for the sample immediately prior to that selected point in time (e.g., a sample of elements chosen from the last 100 elements scanned) and randomly selecting a second predetermined number of the scanned elements that were stored in the data bucket during that specified interval. Contrary, to the process of selecting scanned elements for inclusion in the bucket, later scanned elements are selected from the data bucket with a lesser probability than earlier scanned elements. Thus, there is a balance of probabilities between selection of scanned elements for inclusion in the bucket and selection of scanned elements for inclusion in the sample, so that any of the elements that were scanned during the specified interval, whether earlier in the interval or later, are included in the sample with equal (i.e., uniform) probability.

In another embodiment of the sampling method of the invention, the elements of the data stream are similarly scanned in one pass. However, as the elements are scanned, a predetermined number of the scanned elements are randomly selected for storage in multiple smaller data buckets. The multiple data buckets can be separate storage areas within memory, where corresponding separate collections of scanned elements, including their attributes (e.g., time scanned) are recorded, stored and maintained. The selection process for each of the buckets is independent and, thus, each of the buckets may contain some of the same data as well as different data, by chance. However, later scanned elements are selected for storage in each of the data buckets with a greater probability than earlier scanned elements. Once an element is selected for storage in a particular data bucket, it is stored in that data bucket and the order in which it was scanned-in is recorded. Furthermore, as the scanning process progresses and each of the data buckets are filled, the elements in the different data buckets are periodically modified (i.e., some elements are deleted from the data bucket and others are added). Again this modification process is random; however, earlier scanned elements are selected for removal from storage with a smaller probability than later scanned elements. As the modification process proceeds, the predetermined number of scanned elements in each of the data buckets is maintained.

In addition to storing scanned elements in the multiple data buckets, at selected times during the scanning process, a sample of the scanned elements is obtained by selecting one or more elements from each of the multiple data buckets. That is, at a selected point in time one or more of the scanned elements from each of the multiple data buckets are randomly selected for inclusion in one of the samples. At another selected point in time one or more of the scanned elements from each of the multiple data buckets are selected for inclusion in another one of the samples, and so on. Thus, multiple samples are obtained. While the selection of the scanned elements is random, the process is such that each of the samples comprises a uniform sample for a specified interval immediately prior to the selected time.

More particularly, each of the samples are obtained by selecting a point in time during the scanning process, identifying a specified interval for the sample immediately prior to that selected point in time (e.g., a sample of elements chosen from the last 100 elements scanned) and randomly selecting a second predetermined number of the scanned elements that were stored in the multiple data buckets during that specified interval. The selected points in time associated with each of the multiple samples may be the same or different. However, if the selected points in time for any of the samples are the same, then the specified interval for those samples should be different. Thus, each of the different samples will be associated with a different interval and, possibly, with a different selected point in time. Furthermore, it is anticipated that the same number of elements (e.g., one) will be selected from each of the multiple data buckets.

Contrary, to the process of selecting scanned elements for inclusion in the data buckets, later scanned elements are selected from the multiple data buckets with a lesser probability than earlier scanned elements. Thus, there is a balance of probabilities between selection of scanned elements for inclusion in each of the buckets and selection of scanned elements for inclusion in each of the samples, so that any of the elements that were scanned during the specified interval, whether earlier in the interval or later, are included in the samples with equal (i.e., uniform) probability.

Once the multiple samples are obtained and, specifically, once the uniform samples associated with specified intervals in the data stream are obtained, then based on these samples, the number of elements that must be deleted from the data stream in order to sort the data stream can be estimated (i.e., the number of elements that must be deleted to place the elements in the data stream in an increasing value order can be estimated). The process of estimating this sortedness number (i.e., the distance from monotonicity) can be accomplished by first identifying the right-most element in each of the multiple samples. Then, for each sample, a determination is made as to whether or not a majority of other elements in the sample have a value that is greater than the right-most element. If so, then the right-most element is placed in a set of right most-elements. The number of elements that must be deleted to place the elements of the data stream in an increasing value order is then estimated as being between half and twice the size of the set.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
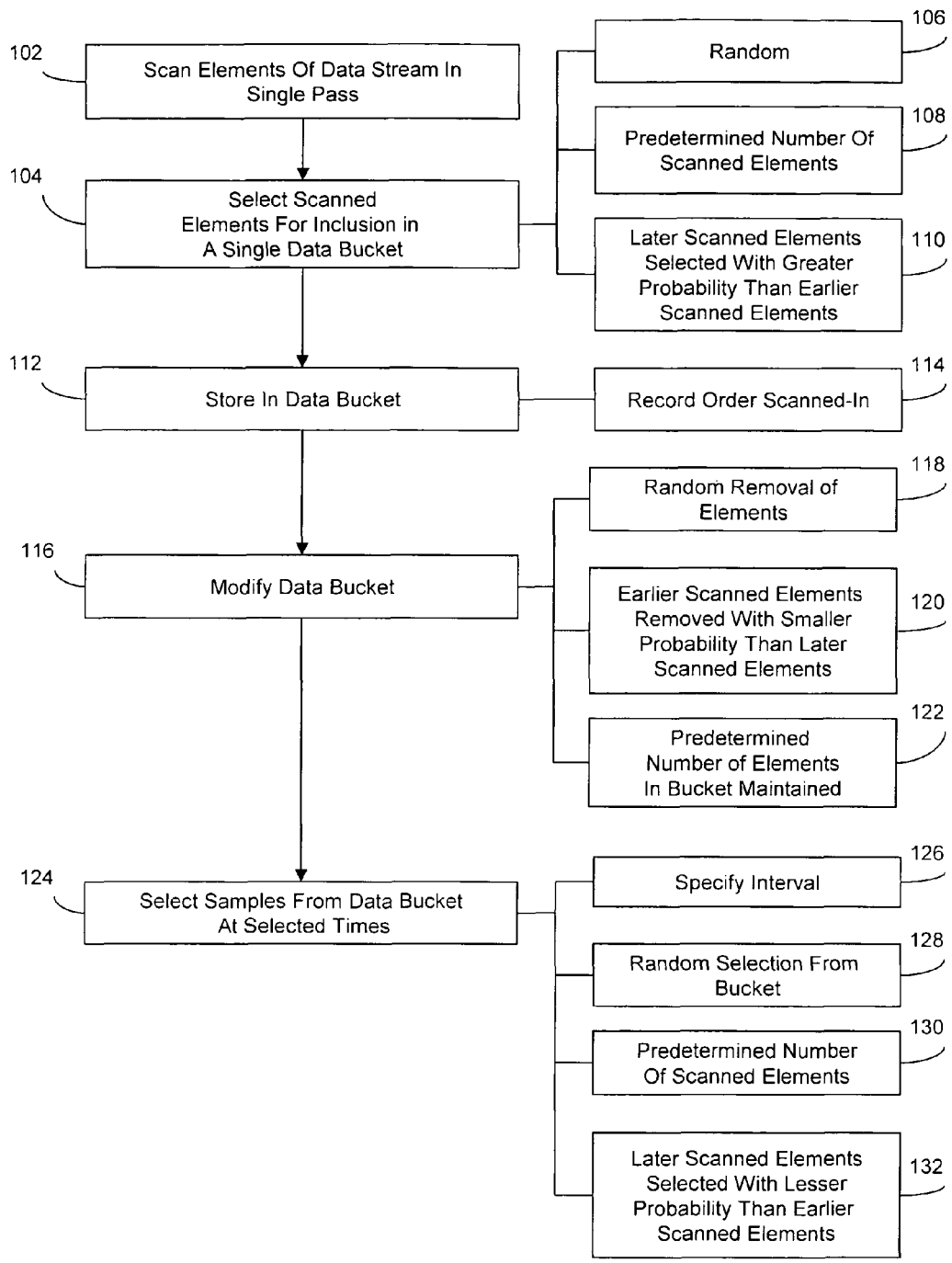
FIG. 1 is a flow diagram illustrating an embodiment of the sampling method of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, there is a need in the art for a method that requires only one pass over a sequence of data elements, samples data elements from the sequence during that one pass and estimates how close the sequence is to being sorted. Therefore, disclosed herein is a method of scanning a data stream one time in order to obtain uniform data samples from selected intervals in that data stream as well as a method of using the obtained data samples to estimate the degree of sortedness of that data stream. The degree of sortedness is also referred to as the distance from monotonicity or the number of elements that must be deleted from the data stream in order to place the elements in the data stream in a sorted order (e.g., an increasing value order). More particularly, disclosed herein are two embodiments of a method of sampling elements from a data stream.

In each of these embodiments multiple samples are obtained (either all from a single large data bucket (see FIG. 1) or each from a corresponding smaller data bucket (see FIG. 2) and each of the samples obtained comprises a uniform sample from a specified interval (e.g., the most recent 100 elements scanned, the most recent 200 elements scanned, etc.) immediately prior to a selected point in time. These multiple data samples are then used to estimate the degree of sortedness of the data stream (see FIG. 3). Also disclosed are exemplary algorithms that may be used to implement the various embodiments of the invention.

Referring to FIG. 1, in one embodiment of the sampling method of the invention, the elements of the data stream are scanned in one pass (102). As the elements are scanned, a predetermined number of the scanned elements are randomly selected for storage in a single data bucket (104-108). The single data bucket can be a single storage area within memory, where a collection of the scanned elements, including their attributes (e.g., time scanned), are recorded, stored and maintained. This selection process is random (106); however, later scanned elements are selected for storage in the data bucket with a greater probability than earlier scanned elements (110). Once an element is selected, it is stored in the data bucket and the order in which it was scanned-in is recorded (112-114). Furthermore, as the scanning process (102) progresses and the data bucket is filled (112), the elements in the data bucket are periodically modified (i.e., some elements are deleted from the data bucket and others are added) (116). Again this modification process is random (118); however, earlier scanned elements are selected for removal from storage with a smaller probability than later scanned elements (120). As the modification process (116) proceeds, the predetermined number of scanned elements in the bucket is maintained (122).

In addition to storing scanned elements in the single data bucket (112), at multiple selected times during the scanning process, a sample of the scanned elements from the data bucket is obtained (124-132). That is, for a sample associated with a selected time, some of the scanned elements from the data bucket are randomly selected for inclusion in the sample (128). Thus, multiple samples (i.e., a different sample associated with each of the selected times) are obtained. While the selection of the scanned elements is random, the process is such that each of the samples comprises a uniform sample for a specified interval immediately prior to its associated selected time. More particularly, each of the samples are obtained by selecting a point in time during the scanning process, identifying a specified interval for the sample immediately prior to that selected point in time (e.g., a sample of elements within the last 100 elements scanned) (126) and randomly selecting (128) a second predetermined number (130) of the scanned elements that were stored in the data bucket during that specified interval. Contrary, to the process of selecting scanned elements for inclusion in the bucket, later scanned elements are selected from the data bucket with a lesser probability than earlier scanned elements (132). Thus, there is a balance of probabilities between selection of scanned elements for inclusion in the bucket and selection of scanned elements for inclusion in the sample, so that any of the elements that were scanned during the specified interval, whether earlier in the interval or later, are included in the sample with equal (i.e., uniform) probability.

Figure 2:
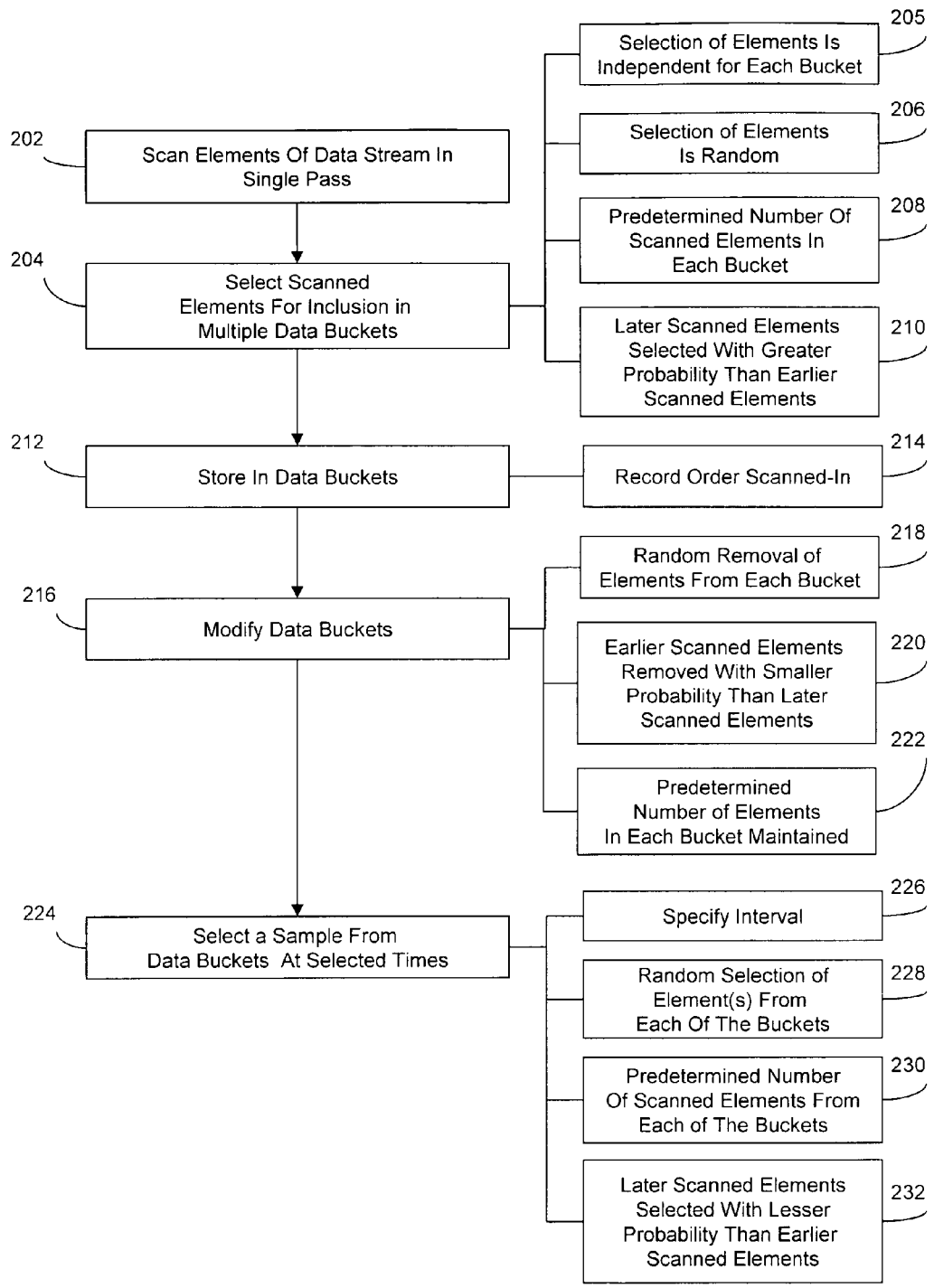
FIG. 2 is a flow diagram illustrating another embodiment of the sampling method of the invention.

Referring to FIG. 2, in another embodiment of the sampling method of the invention, the elements of the data stream are similarly scanned in one pass (202). However, as the elements are scanned, a predetermined number of the scanned elements are selected for storage in multiple smaller data buckets (204-210). The multiple data buckets can be separate storage areas within memory, where corresponding separate collections of scanned elements, including their attributes (e.g., time scanned) are recorded, stored and maintained. The selection process for each of the buckets is independent (205) and the selection of each element for each bucket is random (206). Thus, each of the buckets may contain some of the same data as well as different data, by chance. While the selection of the elements for inclusion in the buckets is random, later scanned elements are selected for storage in each of the data buckets with a greater probability than earlier scanned elements (210). Once an element is selected for storage in a particular data bucket, it is stored in that data bucket and the order in which it was scanned-in is recorded (212-214). Furthermore, as the scanning process progresses (202) and each of the data buckets are filled (212), the elements in the different data buckets are periodically modified (i.e., some elements are deleted from the data bucket and others are added) (216). Again this modification process is random (218); however, earlier scanned elements are selected for removal from storage with a smaller probability than later scanned elements (220). As the modification process (216) proceeds, the predetermined number of scanned elements in each of the data buckets is maintained (222).

In addition to storing scanned elements in the multiple data buckets, at selected times during the scanning process, a sample of the scanned elements is obtained by selecting one or more elements from each of the multiple data buckets (224-232). That is, at a selected point in time one or more scanned elements from each of the multiple data buckets are randomly selected for inclusion in one of the samples (228). At another selected point in time one or more of the scanned elements from each of the multiple data buckets are similarly randomly selected for inclusion in another one of the samples, and so on. Thus, multiple samples are obtained. While the selection of the scanned elements for inclusion in the sample is random, the process is such that each of the samples comprises a uniform sample for a specified interval immediately prior to the selected time.

More particularly, each of the samples are obtained by selecting a point in time during the scanning process, identifying a specific interval for the sample that is immediately prior to that selected point in time (e.g., a sample of elements chosen from the last 100 elements scanned) (226) and randomly selecting a second predetermined number of the scanned elements that were stored in the multiple data buckets during that specified interval (228-230).

It should be noted that the selected points in time associated with each of the multiple samples may be the same or different. However, if the selected points in time for any of the samples are the same, then the specified interval for those samples should be different. Thus, each of the different samples will be associated with a different interval and, possibly, with a different selected point in time. Furthermore, it is anticipated that the same number of elements (e.g., one) will be selected from each of the multiple data buckets.

Contrary, to the process of selecting scanned elements for inclusion in the data buckets, later scanned elements are selected from the data buckets with a lesser probability than earlier scanned elements (232). Thus, there is a balance of probabilities between selection of scanned elements for inclusion in each of the buckets and selection of scanned elements for inclusion in each of the samples, so that any of the elements that were scanned during the specified interval, whether earlier in the interval or later, are included in the samples with equal (i.e., uniform) probability.

Figure 3:
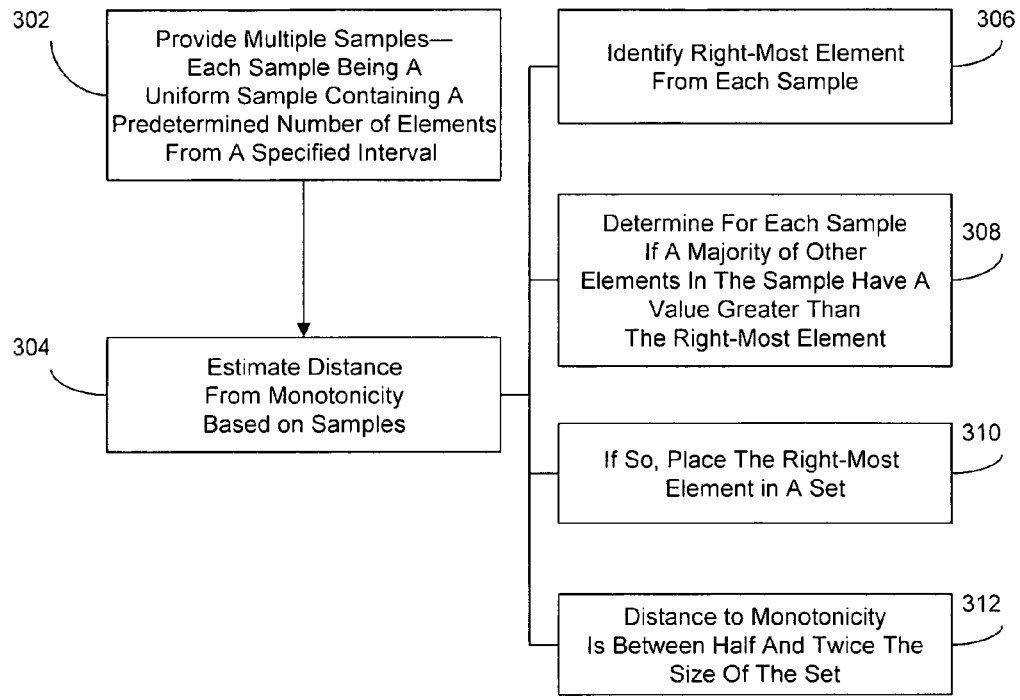
FIG. 3 is a flow diagram illustrating a method of estimating the distance from monotonicity of a data stream based on the samples obtained using the techniques illustrated in FIG. 1 or 2.

Referring to FIG. 3, once the multiple samples are obtained using, for example, the techniques set out in FIG. 1 or 2 and, specifically, once the uniform samples associated with specified intervals in the data stream are obtained (302), then based on these samples, the number of elements that must be deleted from the data stream in order to sort the data stream can be estimated (i.e., the distance from monotonicity or the number of elements that must be deleted to place the elements in the data stream in an increasing value order can be estimated) (304). The process of estimating this sortedness number (i.e., estimating the distance from monotonicity) can be accomplished by first identifying the right-most element in each of the multiple samples (306). Then, for each sample, a determination is made as to whether or not a majority of other elements in the sample have a value that is grater than the right-most element (308). If so, then the right-most element is placed in a set of right most-elements (310). The number of elements that must be deleted to place the elements of the data stream in an increasing value order is then estimated as being between half and twice the size of the set (312).

While the embodiments of the sampling techniques illustrated in FIGS. 1 and 2 are described in terms of their use in conjunction with estimating the degree of sortedness of a data stream, it is anticipated these techniques may also be used in conjunction with any other data stream analyses requiring such samples from specified intervals.

More particularly, a sequence σ of length n over an alphabet Σ={1, . . . , m}, is said to be montone (or increasing) if:

$$\sigma(1) \leq \sigma(2) \ldots \leq \sigma(n)$$

The distance from monotonicity of a sequence σ denoted by Ed(σ) is the minimum number of edit operations needed to make it monotone. That is, the minimum number of edit operations needed to sort the elements in increasing value order. A single edit operation consists of deleting a character and inserting it in a new position. If m=n and σ consists of n distinct characters, then Ed(σ) corresponds to the Ulam distance between σ and the identity permutation. If we think of σ as a deck of cards, then this is the minimum number of moves needed to sort the deck. Thus, it is a natural measure of the degree of sortedness of a sequence. Equivalently, we can define a single edit operation as modifying the value of σ at a particular location. The minimum number of edits required to make σ montone is still Ed(σ). But this way, a permutation may not stay a permutation.

A subsequence $(i_1, \ldots, i_k)$ of σ where $i_1 < i_2 \ldots < i_k$ is said to be monotone or increasing if $\sigma(i_1) \leq \sigma(i_2) \ldots \leq \sigma(i_k)$. Let LIS(σ) denote the length of the largest monotone subsequence of σ. The least number of edit operations required to make σ monotone is to identify a longest increasing subsequence and insert all the other elements into their correct position in this subsequence. So it holds that:

$$LIS(\sigma)+Ed(\sigma)=n$$

Thus, the embodiments of the method of the invention illustrated in FIGS. 1-3 present a one-pass randomized streaming algorithm that requires space (i.e., storage) $O(\log^2 n)$ and computes a factor 4+ϵ approximation to Ed(σ) for any desired constant ϵ>0. This algorithm is useful when dealing with large data sets and in network routing.

The problem of computing various metrics on permutations in a streaming fashion has been studied extensively and efficient algorithms are known for several metrics other than edit distance. Ajtai et al. (see reference [1]) and Gupta and Zane (see reference [2]) considered the problem of counting the number of inversions in a stream of numbers and addressed the need for an efficient algorithm for estimating the distance from monotonicity. Cormode et al. (see reference [3]) provided data-stream algorithms for transposition distance and inversion distance. Some results for the related problem of finding the longest increasing sequence in a data stream are given by Liben-Nowel et al. (see reference [4]), but these results do not provide a data-stream algorithm using sub-linear space. The techniques used in the embodiments of the present invention build on a body of work (e.g., see references [5]-[7]) on the subject of property testing algorithms. Informally, property testing algorithms are highly efficient algorithms that estimate a function without reading the entire input, just by probing the input data at a few randomly chosen locations. However, the quality of the estimate is usually quite low.

A first approach to computing ED(σ) could be to relate it to the number of inversions in σ. However, it is well known that these quantities can be far apart. Ergun et al. [5] showed that a suitable variation of this idea can be used to give a lower-bound on ED(σ). Specifically, Ergun et al. considered the set of indices that are endpoints of an interval where the majority of elements are inverted with respect to the endpoint and showed that the cardinality of this set is a lower bound on ED(σ). Extending this observation, Ailon et al. [8] showed that this lower bound actually gives a factor-2 approximation to ED(σ).

The embodiments of the present invention, and particularly, the technique of estimating the distance from monotonicity, illustrate that it actually suffices to consider the set of indices that are right end-points of such an interval (namely, where the majority of elements are inverted with respect to the endpoint), since the cardinality of this set provides a factor-4 approximation to ED(σ) (see processes 306-312). This technical difference from [5] and [8] is in fact crucial to the design of a data-stream algorithm, since when passing over the data from left to right, it is not known how to check if the index is the left endpoint of such an interval. In contrast, embodiments of the present invention disclose a novel sampling scheme that can actually test whether the index is the right endpoint of such an interval. The embodiments of the sampling scheme of the present invention (see FIGS. 1 and 2) are similar in spirit to the notion of Reservoir Sampling introduced by Vitter [9], which solves the following problem: given access to a set of inputs arriving in streaming fashion, how is it possible to produce, at any point in time, random elements from the set of all inputs seen so far, using a small storage (memory). The embodiments of the sampling scheme of the present invention are more complicated in that they solve the following problem: given access to a set of inputs arriving in a streaming fashion, how is it possible to produce samples from numerous different subsets of all the inputs seen so far, namely from the last k inputs seen for numerous different values of k>0. Finally, it is well-known that any property testing algorithm can be simulated by a streaming algorithm. Thus, one can simulate the property testing algorithm of Ailon et al. [8] in streaming fashion. However, the space required by this algorithm can be as high as linear in the input size to get a high quality estimate.

The following discussion provides a more detailed description of the embodiments of the sampling schemes of the present invention (as set out in FIGS. 1 and 2) and the techniques used to estimate the degree of sortedness based on the samples obtained (as set out in FIG. 3) as well as algorithms that may be used to implement these embodiments.

The technique used to estimate the degree of sortedness can be characterized via inversions. That is, a pair of indices (i,j) is said to be inverted in $\sigma$ if i>j but $\sigma(i) < \sigma(j)$. For a given index i let Inv(i) denote the set of indices j that are inverted with respect to i. A set R can be defined which consists of all indices i that are the right end-points of intervals where the majority of elements are inverted with respect to i (see items 306-310 of FIG. 3). Formally, R={i∈[n]|∃ j s.t. majority of indices in [j, i−1] lie in Inv(i)}

Interpret the majority as being a strict majority. In particular, if (i−1, i) is an inversion, then i∈R. More generally, for $\delta \leq \frac{1}{2}$ define $R_\delta$ to consist of all indices i that are the right end-points of an interval where a $\delta$ fraction of elements are inverted with respect to i.

$R_\delta$={i∈[n]|∃ j s.t. more than $\delta$ fraction of indices in [j, i−1] lie in Inv(i)}

Lemma 1: The following bound holds for all $\delta \leq \frac{1}{2}$:

$$\frac{Ed(\sigma)}{2} \leq |R| \leq |R_\delta| \leq \frac{Ed(\sigma)}{\delta}$$

First, to see that Ed($\sigma$)≤2|R|, it suffices to give an algorithm that deletes at most 2|R| indices and returns an increasing subsequence of $\sigma$ is shown (see 312 of FIG. 3). Assume without loss of generality that $\sigma$(n+1)=m so n+1∉R. The algorithm begins with i=n+1 and scans the string from right to left. If i−1∉R, then it moves to i−1. Otherwise, it skips to the largest j<i that is not in R or in Inv(i). It deletes all the indices in [j+1, i−1].

Proposition 2: The algorithm deletes at most 2|R| indices and returns an increasing sequence (see 312 of FIG. 3)

Proof of Proposition 2: A majority of the indices that are deleted at any step lie in R. To see this, let i∉R and let j be the largest index such that j<i and j does not belong to either of Inv(i) or R. Every element in [j+1, i−1] lies in Inv(i) or R. However, since i∉R, at least half the indices from [j+1, i−1] do not lie in Inv(i) hence they lie in R.

The algorithm returns a subsequence ($i_1, \ldots, i_k$) so that ($i_{l-1}, i_l$) is not an inversion. Thus, consecutive elements are in the right order, so the entire sequence is monotone. The inclusion $R \subseteq R_\delta$ follows from the definition. Thus, $|R| \leq |R_\delta|$. To prove the upper bound on $|R_\delta|$, fix a set $D \subseteq [n]$ of indices of size Ed($\sigma$) so that deleting D leaves a monotone sequence. Note that the set D may not unique. Define $D^c$ to be the complement of D, and $S_\delta$ to consist of all indices i∈$D^c$ that are the right end-points of a interval where a $\delta$ fraction of elements lie in D.

$S_\delta$={i∈[n]|i∈$D^c$,∃ j s.t. more than $\delta$ fraction of indices in [j, i−1] lie in D}

This j is a witness for the membership of i in $S_\delta$. The algorithm then scans left to right and computes the set $S_\delta$ iteratively: Start with the smallest index j∈D. Find the smallest index k>j so that at most $\delta$ fraction of [j, k−1] lies in D. Add the indices in [j, k−1]∩$D^c$ to $S_\delta$. Let l be the smallest index greater than k that lies in D. Set j=l and repeat.

Proposition 3: For every $\delta \leq \frac{1}{2}$, $|S_\delta| \leq Ed(\sigma)\left(\frac{1}{\delta} - 1\right)$ Proof of Proposition 3: Assuming that the set output by the algorithm is in fact $S_\delta$, it is clear that $$|D| + |S_\delta| \leq \frac{1}{\delta}|D|.$$

The bound follows since |D|=Ed($\sigma$). $S_\delta$ must be computed correctly. Furthermore, the algorithm must correctly compute the set $S_\delta \cap [1, l-1]$. It is clear that all indices in [1, j] do not lie in $S_\delta$. Fix an index i∈[j, k−1]∩$D^c$. Since i<k so by the choice of k, at least a $\delta$ fraction of [j, i−1] lies in D which shows i∈$S_\delta$.

To show k∉$S_\delta$, let j' be a potential witness. If j'∈[j, k−1], partition the interval [j, k−1] into [j, j'−1] and [j', k−1]. By the choice of k, more than $\delta$ fraction of [j, j'−1] lies in D. If the same holds for [j', k−1], then it also holds for [j, k−1] but this contradicts the choice of k. So j' cannot be a witness. On the other hand, if j'<j, then the ratio of elements from D only decreases, so k∉$S_\delta$. Similarly, any i∈[k, l−1] does not lie in $S_\delta$. Hence, the algorithm correctly identifies the set $S_\delta \cap [1, l-1]$.

Also, if i>l lies in $S_\delta$, there is always a witness j≥l. This is because if j<l is a witness, the interval [j, i−1] can be partitioned into [j, l−1] and [l, i−1]. The first interval has at most a $\delta$ fraction from D since l−1∉$S_\delta$. Hence [l, i−1] contains more than $\delta$ fraction from D so l serves as a witness.

Proposition 4: For every $\delta \leq \frac{1}{2}$, $|R_\delta| \leq \frac{Ed(\sigma)}{\delta}$ Proof of Proposition 4: $R_\delta$ can be partitioned into $R_\delta \cap D$ and $R_\delta \cap D^c$. Clearly, $|R_\delta \cap D| \leq |D| = Ed(\sigma)$. The size of $R \cap D^c$ can be bounded. Note that the set $D^c$ forms an increasing sequence. Thus, if i, j∈$D^c$, then they are not inverted. Hence, for any i∈$D^c$, Inv(i)⊆D. Thus, if i∈$R_\delta \cap D^c$, then i∈$S_\delta$. Hence, $$|R_\delta \cap D^c| \leq |S_\delta| \leq Ed(\sigma)\left(\frac{1}{\delta} - 1\right)$$

Both bounds are asymptotically tight. For the first bound, let k<n/4 and take the permutation π=k+1, ..., n/2, n, ..., n−k+1,1, ..., k, n/2+1, ..., n−k. Here Ed(π)=2k, whereas |R|=k. For the second bound, let k<δn. Consider the permutation σ=n,n−1, ..., n−k+1,1,2 ..., n−k. In this case it can be verified that Ed(σ)=k, whereas |R_δ|=k/δ−2.

Consequently, the above characterization via inversions, suggests a naive algorithm that may be used to implement the estimation technique of FIG. 3 (i.e., the technique for estimating the distance from monotonicity ED(σ)) using the sampling technique of FIG. 1 or 2. That is, for each interval I=[j; i−1] ending in i, collect samples of O(log i) elements from a bucket B and, particularly, from within each interval I in bucket B,(see processes 124-132 of FIG. 1 or 224-232 of FIG. 2). Specifically, to implement this naive algorithm, samples may be obtained from a bucket (see FIG. 1) of elements that are randomly selected from the data stream on the fly. The elements in the bucket are periodically updated (i.e., removed and new elements added, see process 116) so that different samples from each interval can be generated (see processes 124-132 of FIG. 1). However, the different samples from different intervals will not be independent. Alternatively, this naive algorithm may also be implemented, by randomly selecting at specified times the same number of elements (e.g., one element) from each of one of multiple smaller buckets (see FIG. 2) of elements (see processes 224-232 of FIG. 2) such that a single independent sample is generated for each interval. Once the samples are obtained, regardless of whether they are obtained from a single bucket or multiple buckets, they are each analyzed to determine whether a majority of the elements in the sample lie in Inv(i), where i is the right-most element of each sample based on the order the elements were scanned (see processes 302-308 of FIG. 3).

Referring particularly to FIG. 1 in conjunction with FIG. 3, exemplary algorithms may be used to implement this embodiment of the invention. Specifically, an algorithm reads element σ(i) at a selected time i. The algorithm then obtains a sample of elements that were already seen in the bucket B by that time (see processes 124 of FIG. 1 and 302 of FIG. 3). The fact that σ(i) is retained in the bucket is denoted by i∈B, but note that the algorithm actually maintains in B a record of the tuple <i, σ(i)>. The algorithm keeps updating the bucket so as to maintain the following distribution at each time i (see processes see 116-120 of FIG. 1):

$$Pr[j \in B \text{ at time } i] = \min\left(1, \frac{C\log(2i)}{|j-i|}\right), \text{ for all } j < i.$$

This probability is denoted by p(j, i) and defined to be 1 for j=i. Note that for every j, p(j, i)≧p(j, i+1). Assume a right distribution at time i. To achieve it at time i+1, add the element σ(i) to the bucket, and for each element σ(j) already in the bucket (j<i), retain it with probability p(j, i)/p(j, i+1).

The following proposition upper bounds the size of the sample that is retained, which immediately implies a similar bound on the space (storage requirement) of the algorithm (see process 122 of FIG. 1).

Proposition 5: At time i, E[|B|]≦C log²(2i). Further |B|=O (log²i) with probability i^{−C}.

Proof of Proposition 5: Let $X_j$ be the indicator variable for index j being in the bucket at time i. Note that the various $X_j$s are independent and $|B| = \Sigma_{j<i} X_j$ since $$Pr[X_j] = \min\left(1, \frac{C\log i}{|i-j|}\right), \text{ and}$$

$$E[|B|] = \sum_{j<i} \min\left(1, \frac{C\log(2i)}{|i-j|}\right) \le$$

$$\sum_{j<i} \frac{C\log(2i)}{|i-j|} \le C\log^2(2i)$$

The high probability bound can be proved by a Chernoff-type argument.

Furthermore, described below is a procedure using B to test whether a near-majority of elements from $I_j=[j, i-1]$ lie in Inv(i) (see processes 306-308 of FIG. 3). Specifically, for the TestBucket (j, i) the following algorithm can be applied:
 (1) Set $S_j \leftarrow \emptyset$.
 (2) For k∈[j,i−1],
 (3) If k∈B, add it to $S_j$ with probability p(j,i)/p(k,i).
 (4) If at least $$\left(\frac{1}{2} - \varepsilon\right)$$

fraction of $S_j$ lies in Inv(i), return Fail.
 (5) Else return Pass.

The set $S_j$ is our set of samples from $I_j$. It is easy to see that for all k∈$I_j$, Pr[k∈$S_j$]=p(j, i). Furthermore, the events for different k (but the same j and i) are independent. The ratio $$\frac{|S_j \cap Inv(i)|}{|S_j|}$$

is a fairly good approximation to $$\frac{|I_j \cap Inv(i)|}{|I_j|}.$$

The error probability of the test is bound by $(2i)^{-O(C)}$, where the constant in the O(C) depends on ε. However, this can be compensated for by choosing C appropriately.

Lemma 6: If a majority of $I_j$ lies in Inv(i), i.e.

$$\frac{|I_j \cap Inv(i)|}{|I_j|} > 1/2,$$

then the probability TestBucket (j,i) returns Fail is at least $1-(2i)^{-O(C)}$.

Proof of Lemma 6:

Suppose $|I_j \cap Inv(i)| > \frac{|I_j|}{2}$.

Hence, $E[|S_j|] = \sum_{k \in I_j} \frac{C\log(2i)}{|j-i|} = C\log(2i)$

-continued $$\text{and } E[|S_j \cap Inv(i)|] = \sum_{k \in I_j \cap (i)} \frac{C\log(2i)}{|j-i|} \geq \frac{1}{2} C\log(2i).$$

Then, it can be shown using Chernoff bounds that with probability $1-i^{-O(C)}$, $|S_j| \leq (1+\epsilon/2)C \log(2i)$ and $|S_j \cap Inv(i)| \geq (\frac{1}{2}-\epsilon/2)C \log(2i)$. Thus, $|S_j \cap Inv(i)| \geq (\frac{1}{2}-\epsilon)|S_j|$ and Test (B,i) will return Fail.

Lemma 7: If less than ($\frac{1}{2}-3\epsilon$) fraction of $I_j$ lies in Inv (i), i.e.

$$\frac{|I_j \cap Inv(i)|}{|I_j|} < (1/2 - 3\varepsilon),$$

then the probability TestBucket(j,i) returns Pass is at least $1-(2i)^{-O(C)}$.

Proof of Lemma 7: Suppose $|I_j \cap Inv(i)| < (\frac{1}{2}-3\epsilon)|I_j|$.

Hence, $E[|S_j|] = \sum_{k \in I_j} \frac{C\log(2i)}{|j-i|} = C\log(2i)$ and $E[|S_j \cap Inv(i)|] = \sum_{k \in I_j \cap Inv(i)} \frac{C\log(2i)}{|j-i|} \leq (1/2 - 3\varepsilon)C\log(2i).$ Then, it can be shown using Chernoff bounds that with probability $1-(2i)^{-O(C)}$ the following bounds hold: $|S_j| \geq (1-\epsilon)C \log(2i)$ and $|S_j \cap Inv(i)| \leq (\frac{1}{2}-2\epsilon)C \log(2i)$. Thus, $|S_j \cap Inv(i)| \leq (\frac{1}{2}-\epsilon)|S_j|$ and Test (B, i) will return Pass.

An exemplary algorithm to estimate the distance from monotonicity can then be described using Test B (i, j). An estimate d is maintained which is initialized to d=0. For each element i, Test B (i,j) is run for j<i. If one of them returns fail, increment d. The bucket B is updated (at process 116 of FIG. 1) and moved to input i+1. Let $\hat{R}$ denote the set of indices i which cause d to increase.

Lemma 8: For every i, with probability $1-\Sigma_i(2i)^{-O(C)}$ the following inclusion holds $R \subseteq \hat{R} \subseteq R_{1/2-3\epsilon}$.

Proof of Lemma 8: Assume that i∈R and let j be a witness to this. Then, by Lemma 6 running Test (i, j) will return Fail with probability $1-(2i)^{-O(C)}$. Hence, $Pr[i \notin \hat{R}] \leq (2i)^{-O(C)}$. Assume on the other hand that $i \notin R_{1/2-3\epsilon}$. Then, for every j<i, fewer than $\frac{1}{2}-3\epsilon$ elements in [j, i−1] belong to (i). By applying Lemma 7 and taking union bound over all i such intervals, the chance that Test B (i, j) returns Fail on any of these intervals is $(2i)^{-O(C)}$. Hence, $Pr[i \in \hat{R}] \leq (2i)^{-O(C)}$.

Hence, the inclusions hold with probability $1-\Sigma_i(2i)^{-O(C)}$, which can be made larger than $1-\delta$ for any fixed $\delta>0$ desired, by taking C to be a sufficiently large constant. By Lemma 1, $|R| \geq Ed(\sigma)/2$ and $$|R_{1/2-3\varepsilon}| \leq \frac{2}{1-6\varepsilon} Ed(\sigma).$$

Hence, with probability $1-\delta$ we get a $4+\epsilon'$ approximation to Ed ($\sigma$).

The description above performs Test B (i, j) for every j<i, so the update time for step i is linear in i. The update time can be reduced to $O(\log^3 i)$ by performing the test only for those j∈B. This can be further reduced to $O(\log^2 i)$ using an idea from [8]. Only try j s for which the length of the interval [j, i−1] changes in scales of $1+\epsilon_1$. More precisely, take $T'(i)=\{1,(1+\epsilon_1),\ldots,i\}$ and let $T(i)=\{j<i \text{ s.t. } j-i\in T'(i)\}$.

Proposition 9: If i∈R, then there exists j'∈T(i) such that at least ($\frac{1}{2}-\epsilon_1$) fraction of elements from [j', i−1] lie in Inv(i).

Proof of Proposition 9: Let j be a witness to the membership of i in R. Hence, a majority of elements from [j, i−1] are in Inv(i). Pick the smallest j'∈T(i) such that j'<j. It follows that $|j-i| \leq |j'-i| \leq (1+\epsilon_1)|j-i|$. Hence, at least $$\frac{1}{2(1+\varepsilon_1)} > (1/2 - \varepsilon_1/2)$$

fraction of elements from [j',i] belong to to Inv(i). $\epsilon_1$ can be chosen so that the analysis of Lemma 6 goes through even with the weaker assumption that $I_j \cap Inv(i) \geq (\frac{1}{2}-\epsilon_1/2)|I_j|$.

Thus, for the EstimateDist ($\sigma$) the following algorithm can be applied:
(1) Set d=0, bucket B is empty.
(2) For i∈[1,n],
(3) Update bucket B.
(4) For each j∈T(i)
(5) If Test B (j, i) returns Fail,
(6) Set d=d+1.
(7) Skip to i+1.
(8) Output d.

Theorem 10: The Algorithm for EstimateDist ($\sigma$) computes a $4+\epsilon$ approximation to Ed($\sigma$) with probability. $1-\delta$ for arbitrarily small constant $\epsilon$ and $\delta$. The space used is $O(\log^2 n)$ where n is the length of the data stream. The update time for element i is $O(\log^2 i)$.

Note that if the length of the data stream n is known in advance, then the distribution of samples in the bucket can be set to be $$Pr[j \in B] = p(j,i) = \min\left(1, \frac{C\log(2n)}{|j-i|}\right)$$

Thus, all the bounds stated above hold with probability $1-n^{-O(1)}$ and the space used and the update time are $O(\log^2 n)$.

The following is a more detailed description of the exemplary algorithms that may be used to implement the embodiment of the invention illustrated in FIG. 1 in combination with FIG. 3. C>0 is a parameter to be determined. The mathematical analysis requires that it is larger than a suitable constant. Recall that $$p(j,i) = \min\left(1, \frac{C\log n}{i-j}\right).$$

$\epsilon_1>0$ is a parameter that depends on the desired accuracy $\epsilon$ (e.g., $\epsilon_1=\epsilon/3$ suffices). To simplify notation, rounding operations are not explicitly written below, but throughout, all non-integral numerical values should be rounded downwards.

For the EstimateDist ($\sigma$) the following algorithm can be applied:
(1) Initialize the bucket B to be empty and set d←0
(2) For each i=1,2, ..., n (3) Read the ith element (i.e. σ(i)) from the input (see processes 104-114 of FIG. 1)

(4) Remove from B each tuple ⟨j, σ(j)⟩ independently with probability $$1 - \frac{p(j, i)}{p(j, i-1)}$$

(see process 116 of FIG. 1)

(5) Add to B the tuple ⟨i, σ(i)⟩ (see process 116 of FIG. 1)

(6) For each j'=0,1, . . . , $\log_{1+\epsilon_1} i$ (7) If TestBucket(i−(1+$\epsilon_1$)$^{j'}$,i) returns Fail (see 124 of FIG. 1 and 302 of FIG. 3)

(8) Set d←d+1 and continue to i+1 at step 2

(9) Output d (see process 312 of FIG. 3).

Furthermore, for the TestBucket (j, i) the following algorithm can be applied:

(1) Initialize the set S to be empty (2) For every tuple ⟨k, σ(k)⟩ in B (see item 302 of FIG. 3)

(3) If j≦k≦i−1 (see process 308 of FIG. 3)

(4) Then add ⟨k, σ(k)⟩ to S with probability p(j, i)/p(k, i)

(5) If at least $$\left(\frac{1}{2} - \varepsilon_1\right)$$

fraction of the tuples ⟨k, σ(k)⟩ in S satisfy σ(k)>σ(i)

(6) Then return Fail (7) Else return Pass

Thus, a simple and efficient technique is disclosed for the randomly selecting elements from a data stream, storing those elements in a bucket and periodically modifying the bucket B to maintain a given distribution (see processes 104 and 116 of FIG. 1). Also disclosed is a technique for obtaining samples by randomly selecting elements from the bucket B bounded by a specified interval at process 124 of FIG. 1. The samples obtained from the bucket can then be used to estimate the distance from monotoncity (see FIG. 3).

Thus, referring to the algorithms set out above, random sampling is used to maintain the bucket in Algorithm EstimateDist and to select the samples that are input into set S in procedure TestBucket. When element j is first seen, the algorithm chooses for it a threshold $Z_j \in [0,1]$ uniformly at random. In practice, $Z_j$ will be determined up to some precision which may be increased during execution. Thus, whenever a sample of element σ(j) with probability p is desired, the sampling is accomplished by testing whether $Z_j \leq p$. In particular, the element σ(j) is retained in the bucket B at all times i for which $Z_j \leq p(j, i)$, so line 4 in the EstimateDist algorithm is changed to removing element j if $Z_j > p(j, i)$. Thus, the random value $Z_j$ provides an "expiration time" at which element j is to be discarded from B. Similarly, line 4 of the TestBucket algorithm is changed so that element k is added to S if $Z_k \leq p(j, i)$. Clearly, the TestBucket algorithm needs to retain the threshold $Z_j$ only for elements σ(j) that are retained in the bucket B. Thus, these thresholds increase the storage requirement only by a small constant factor. The important aspect is that the different $Z_j$ are independent; it does not matter that the same $Z_j$ is used for different samples S in TestBucket algorithm, since we apply a union bound over the different executions of this procedure.

The advantage of this threshold value is that there is that it only one call to a random (or pseudo-random) number generator every time a new element is input. In addition, it avoids probability of the sort p(j,i)/p(j, i−1) which is very close to 1 and, thus, it is effectively more expensive to draw events according to such probabilities.

The following is a detailed description of exemplary algorithms that may be used to implement the embodiment of the invention illustrated in FIG. 2 in combination with FIG. 3. In this alternative embodiment, the algorithm maintains O(log n) smaller buckets (see process 212 of FIG. 2). That is, in the sequence, $C_1$, $C_2$, $C_3$>0 there are three parameters to be determined. The mathematical analysis requires that these parameters are larger than a suitable constant. Define $$q(j, i) = \min\left(1, \frac{C_2}{i-j}\right).$$

$\epsilon_1$>0 is a parameter that depends on the desired accuracy $\epsilon$ (e.g., $\epsilon_1$=$\epsilon$/3 suffices). As with the previously described embodiment, to simplify notation, rounding operations are not explicitly written, but throughout, all non-integral numerical values should be rounded downwards.

For the EstimateDist (σ) the following algorithm can be applied:

(1) Set d←0 and t←$C_1 C_3$ log n and initialize t buckets $B_1$, . . . , $B_t$ to be empty (2) For each i=1,2, . . . , n (3) Read the ith element (i.e., σ(i)) from the input (see processes 204-214 of FIG. 2)

(4) For each s=1, . . . t (5) Remove from $B_s$ each tuple ⟨j, σ(j)⟩ independently with probability $$\left(\frac{1}{2} - \varepsilon_1\right)$$

(see process 216 of FIG. 2)

(6) Add to $B_s$ the tuple ⟨i, σ(i)⟩ (see process 216 of FIG. 2)

(7) For each j'=0,1, . . . , $\log_{1+\epsilon_1} i$ (8) Set S to be the empty set (9) For each s=1, . . . t

(10) Add to S the element returned by SampleOneBucket ($B_s$, j', i) (see processes 224-232 of FIG. 2 and 302 of FIG. 3)

(11) If at least $$1 - \frac{q(j, i)}{q(j, i-1)}$$

fraction of the tuples k, σ(k) in S satisfy σ(k)>σ(i) (see FIG. 3)

(12) Then d←d+1 and continue to i+1 at step 2

(13) Output d (see process 312 of FIG. 3).

Furthermore, instead of TestBucket (j, i) the following SampleOneBucket ($B_s$, j', i) algorithm should be applied:

(1) Initialize the set S' to be empty (2) For every tuple ⟨k, σ(k)⟩ in $B_s$ (see process 302 of FIG. 3)

(3) If j≦k≦i−1 (see process 308 of FIG. 3)

(4) then add k, σ(k) to S' with probability q(j, i)/q(k, i).

(5) return a random element from S (if any)

As with the previously described algorithms, a simple and efficient sampling is possible by retaining for each element in each bucket a random threshold value $Z_{sj}$. It is important to choose independently the thresholds for different buckets $B_s$.

The embodiments of the invention, described above, can take the form of an entirely hardware embodiment, an entirely software embodiment or an embodiment including both hardware and software elements. In one embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For example, one embodiment can comprise a program storage device readable by computer and tangibly embodying a program of instructions executable by the computer to perform the above-described method of evaluating elements in a data stream. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
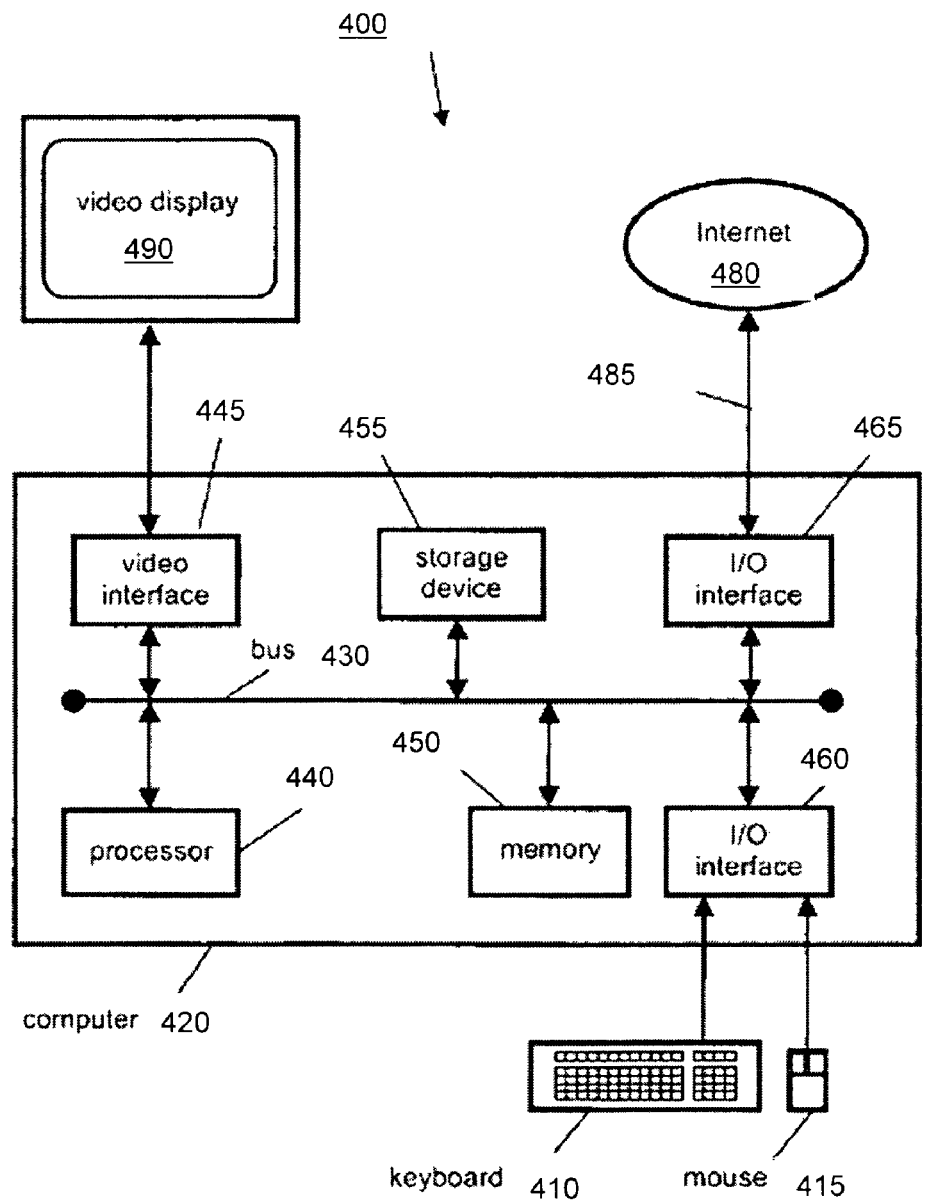
FIG. 4 is a schematic representation of a computer system suitable for implementing the method of the invention as described herein.

FIG. 4 is a schematic representation of a computer system 400 that can be used for implementing the method of the invention as described herein. Computer software executes under a suitable operating system installed on the computer system 400 to assist in performing the described techniques. This computer software can be programmed using any suitable computer programming language, and may comprise various software code means for achieving particular steps. The components of the computer system 400 can include a computer 420, a keyboard 410 and a mouse 415, and a video display 490. The computer 420 can include a processor 440, a memory 450, input/output (I/O) interfaces 466, 465, a video interface 445, and a storage device 455. The processor 440 can be a central processing unit (CPU) that executes the operating system and the computer software executing under the operating system. The memory 450 can include random access memory (RAM) and read-only memory (ROM), and can be used under direction of the processor 440. The video interface 445 can be connected to video display 490. User input to operate the computer 420 can be provided from the keyboard 410 and mouse 415. The storage device 455 can include a disk drive or any other suitable storage medium. Each of the components of the computer 420 can be connected to an internal bus 430 that includes data, address, and control buses, to allow components of the computer 420 to communicate with each other via the bus 430. The computer system 400 can be connected to one or more other similar computers via input/output (I/O) interface 465 using a communication channel 465 to a network, represented as the Internet 480. The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420. Other configurations or types of computer systems can be equally well used to implement the described techniques. The computer system 400 described above is described only as an example of a particular type of system suitable for implementing the described techniques.

Therefore, disclosed above is a method of scanning a data stream one time in order to obtain uniform data samples from selected intervals in that data stream as well as a method of using the obtained data samples to estimate the degree of sortedness of that data stream. The method comprises scanning the data stream, randomly selecting elements from the data stream for storage in one more data buckets, and randomly selecting multiple samples from the data bucket(s) such that each sample comprises a sample from a specified interval immediately prior to a selected point in time. Although element selection is random, there is a balance of probabilities between the selection of elements stored in the bucket(s) and the selection of elements included in the sample so that any of the elements that were scanned during the specified interval, whether earlier in the interval or later, are included in the sample with equal (i.e., uniform) probability. These multiple uniform data samples are then used to estimate the degree of sortedness of the data stream.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments of the invention can be practiced with modification within the spirit and scope of the appended claims.

REFERENCES

[1] Miklos Ajtai, T. S. Jayram, Ravi Kumar, and D. Sivakumar. Approximate counting of inversions in a data stream. In *Proceedings of the 34th Annual ACM Symposium on Theory of Computing* (STOC '02), pages 370-379, 2002.

[2] Anupam Gupta and Francis Zane. Counting inversions in lists. In *Proceedings of the 14th ACM-SIAM Symposium on Discrete Algorithms* (SODA '03), pages 253-254, 2003.

[3] G. Cormode, S. Muthukrishnan, and S. C. Sahinalp. Permutation editing and matching via embeddings. In *Proceedings of 28th International Colloquium on Automata, Languages and Programming (ICALP '01), pages 481-492, 2001.

[4] David Liben-Nowell, Erik Vee, and An Zhu. Finding longest increasing and common subsequences in streaming data. In *Computing and Combinatorics, 11th Annual International Conference,* (COCOON '05), pages 263-272, 2005.

[5] Funda Ergun, Sampath Kannan, Ravi Kumar, Ronitt Rubinfeld, and Mahesh Viswanathan. Spot-checkers. *Journal of Computing and System Sciences,* 60(3):717-751, 2000.

[6] Oded Goldreich, Shafi Goldwasser, Eric Lehman, Dana Ron, and Alex Samorodnitsky. Testing monotonicity. *Combinatorica,* 20(3):301-337, 2000.

[7] Eldar Fischer, Eric Lehman, Ilan Newman, Sofya Raskhodnikova, Ronitt Rubinfeld, and Alex Samorodnitsky. Monotonicity testing over general poset domains. In *Proceedings of the 34th Annual ACM Symposium on Theory of Computing* (STOC '02), pages 474-483, 2002.

[8] Nir Ailon, Bernard Chazelle, Seshadhri Comandur, and Ding Liu. Estimating the distance to a monotone function. In *8th International Workshop on Randomization and Computation,* (RANDOM '04), pages 229-236, 2004.

[9] Jeffrey Scott Vitter. Random sampling with a reservoir. *ACM Transactions on Mathematical Software,* 11(1):37-57, 1985.

What is claimed is:

1. A method of evaluating elements in a data stream, said method comprising:
    scanning, by a computer system, said elements as said data stream is being received by said computer system, wherein sortedness of said elements is unknown;
    as said elements are scanned, randomly selecting, by said computer system, a predetermined number of scanned elements for storage in a data bucket;
    storing, by said computer system, said predetermined number of said scanned elements in said data bucket;
    at multiple selected times during said scanning, selecting, by said computer system, a sample of said scanned elements from said data bucket such that multiple samples are obtained and such that said multiple samples comprise uniform samples for specified intervals immediately prior to said selected times;
    evaluating, by said computer system, each one of said multiple samples, wherein, for each sample, said evaluating comprises:
    identifying a right-most element in said sample;
    determining if a majority of other elements in said sample have a greater value than said right-most element; and
    if so, placing said fight-most element in a set of right-most elements;
    based on a size of said set of fight-most elements, estimating, by said computer system, a number of said elements in said data stream that must be deleted from said data stream in order to sort said elements in said data stream into a sequence having an increasing value order; and
    wherein said estimating comprises estimating said number as being between half and twice a size of said set of right-most elements.

2. The method of claim 1, further comprising periodically modifying said bucket such that said predetermined number is maintained.

3. The method of claim 1, wherein later scanned elements are selected for storage in said data bucket with a greater probability than earlier scanned elements and wherein later scanned elements are selected from said data bucket with a lesser probability than earlier scanned elements.

4. The method of claim 1, wherein said storing comprises recording an order in which said scanned elements are stored and wherein said selecting of said sample comprises identifying a specified interval and randomly selecting a second predetermined number of said scanned elements that were stored in said data bucket during said specified interval.

5. A method of evaluating elements in a data stream, said method comprising:
    scanning, by a computer system, said elements as said data stream is being received by said computer system, wherein sortedness of said elements is unknown;
    as said elements are scanned, randomly selecting, by said computer system, scanned elements for storage in multiple data buckets such that selection of said scanned elements for storage in each one of said multiple data buckets is independent of selection of said scanned elements for storage in any other of said multiple data buckets;
    storing, by said computer system, said scanned elements in said multiple data buckets such that each of said data buckets comprises a predetermined number of said scanned elements;
    at selected times during said scanning, selecting, by said computer system, a sample of said scanned elements from said multiple data buckets such that multiple samples are obtained and such that said multiple samples comprise uniform samples of said scanned elements for specified intervals immediately prior to said selected times;
    evaluating, by said computer system, each one of said multiple samples, wherein for each sample, said evaluating comprises:
    identifying a right-most element in said sample;
    determining if a majority of other elements in said sample have a greater value than said right-most element; and
    if so, placing said fight-most element in a set of right-most elements;
    based on a size of said set of fight-most elements, estimating, by said computer system, a number of said elements in said data stream that must be deleted from said data stream in order to sort said elements in said data stream into a sequence having an increasing value order; and
    wherein said estimating comprises estimating said number as being between half and twice a size of said set of right-most elements.

6. The method of claim 5, further comprising periodically modifying said data buckets such that said predetermined number is maintained in each of said data buckets.

7. The method of claim 5, wherein later scanned elements are selected for storage in said data buckets with a greater probability than earlier scanned elements and wherein later scanned elements are selected from said bucket with a lesser probability than earlier scanned elements.

8. The method of claim 5, wherein said storing comprises recording an order in which said scanned elements are stored in each of said data buckets and wherein said selecting of said sample comprises identifying a specified interval and randomly selecting a second predetermined number of said scanned elements that were stored in said data buckets during said specified interval.

9. A program storage device readable by computer and tangibly embodying a program of instructions executable by said computer to perform a method of evaluating elements in a data stream, said method comprising:

scanning said elements as said data stream is being received, wherein sortedness of said elements is unknown;

as said elements are scanned, randomly selecting a predetermined number of scanned elements for storage in a data bucket;

storing said predetermined number of said scanned elements in said data bucket;

at multiple selected times during said scanning, selecting a sample of said scanned elements from said data bucket such that multiple samples are obtained and such that said multiple samples comprise uniform samples for specified intervals immediately prior to said selected times;

evaluating each one of said multiple samples, wherein, for each sample, said evaluating comprises:

identifying a right-most element in said sample;

determining if a majority of other elements in said sample have a greater value than said right-most element; and if so, placing said right-most element in a set of right-most elements;

based on a size of said set of right-most elements, estimating, a number of said elements in said data stream that must be deleted from said data stream in order to sort said elements in said data stream into a sequence having one of an increasing value order and a decreasing value order; and wherein said estimating comprises estimating said number as being between half and twice a size of said set of right-most elements.

10. The program storage device of claim 9, wherein said method further comprises periodically modifying said bucket such that said predetermined number is maintained.

11. The program storage device of claim 9, wherein said storing comprises recording an order in which said scanned elements are stored and wherein said selecting of said sample comprises identifying a specified interval and randomly selecting a second predetermined number of said scanned elements that were stored in said data bucket during said specified interval.

12. A program storage device readable by computer and tangibly embodying a program of instructions executable by said computer to perform a method of evaluating elements in a data stream, said method comprising:

scanning said elements as said data stream is being received, wherein sortedness of said elements is unknown;

as said elements are scanned, randomly selecting scanned elements for storage in multiple data buckets such that selection of said scanned elements for storage in each one of said multiple data buckets is independent of selection of said scanned elements for storage in any other of said multiple data buckets;

storing said scanned elements in said multiple data buckets such that each of said data buckets comprises a predetermined number of said scanned elements;

at selected times during said scanning, selecting a sample of said scanned elements from said multiple data buckets such that multiple samples are obtained and such that said multiple samples comprise uniform samples of said scanned elements for specified intervals immediately prior to said selected times;

evaluating each one of said multiple samples, wherein, for each sample, said evaluating comprises:

identifying a right-most element in said sample;

determining if a majority of other elements in said sample have a greater value than said right-most element; and if so, placing said fight-most element in a set of right-most elements;

based on a size of said set of fight-most elements, estimating a number of said elements in said data stream that must be deleted from said data stream in order to sort said elements in said data stream into a sequence having one of an increasing value order and a decreasing value order; and wherein said estimating comprises estimating said number as being between half and twice a size of said set of right-most elements.

\* \* \* \* \*